US009940482B1

(12) United States Patent
Nichols et al.

(10) Patent No.: US 9,940,482 B1
(45) Date of Patent: Apr. 10, 2018

(54) ELECTRONIC ALERTS FOR CONFIDENTIAL CONTENT DISCLOSURES

(71) Applicant: Wells Fargo Bank, N.A., San Francisco, CA (US)

(72) Inventors: Tambra Nichols, Charlotte, NC (US); Matthew P. Schlachtman, San Francisco, CA (US); Michael A. Tilaro, San Francisco, CA (US); Tleytmas N. Stephenson, Oakland, CA (US); Roohi Moolla, San Rafael, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 153 days.

(21) Appl. No.: 14/985,755

(22) Filed: Dec. 31, 2015

(51) Int. Cl.
*H04L 29/06* (2006.01)
*G06F 21/62* (2013.01)
*H04L 29/08* (2006.01)

(52) U.S. Cl.
CPC .......... *G06F 21/6263* (2013.01); *H04L 67/22* (2013.01); *H04L 67/306* (2013.01)

(58) Field of Classification Search
CPC ................................. G06F 21/6263
USPC .......................................................... 726/26
See application file for complete search history.

(56) References Cited

U.S. PATENT DOCUMENTS

| 6,658,393 | B1 | 12/2003 | Basch et al. | |
|---|---|---|---|---|
| 8,539,599 | B2 * | 9/2013 | Gomez | G06F 21/46 |
| | | | | 713/182 |
| 8,887,245 | B1 | 11/2014 | Wiltzius | |
| 9,055,097 | B1 | 6/2015 | Foster | |
| 9,070,146 | B2 | 6/2015 | Bayer et al. | |
| 2006/0155764 | A1 | 7/2006 | Tao | |
| 2011/0004922 | A1 | 1/2011 | Bono et al. | |
| 2012/0136866 | A1 | 5/2012 | Carter et al. | |
| 2014/0150109 | A1 | 5/2014 | Fire et al. | |
| 2014/0172751 | A1 | 6/2014 | Greenwood | |
| 2014/0193038 | A1 * | 7/2014 | Kasahara | G06K 9/228 |
| | | | | 382/103 |
| 2014/0230066 | A1 | 8/2014 | Hurwitz | |
| 2014/0282977 | A1 | 9/2014 | Madhu et al. | |
| 2015/0088574 | A1 * | 3/2015 | Libin | G06Q 10/1095 |
| | | | | 705/7.19 |

OTHER PUBLICATIONS

"NEXGATE—New Report: The State of Social Media Part 3", [Online]. Retrieved from the Internet: <URL: http://nexgate.com/. (Accessed Sep. 29, 2015), 5 pgs.

(Continued)

*Primary Examiner* — Longbit Chai
(74) *Attorney, Agent, or Firm* — Schwegman Lundberg & Woessner, P.A.

(57) ABSTRACT

A method may include receiving content included in a social media post of a user; analyzing the content included in the social media post to determine a likelihood that the social media post contains security information associated with the user; transmitting an alert to a computing device of the user, based on the analyzing, that the content includes the security information associated with the user; and presenting an option to change the security information.

17 Claims, 4 Drawing Sheets

(56) References Cited

OTHER PUBLICATIONS

Ray, "Banks That Have Implemented Social Media Payments Through Facebook and Twitter", [Online]. Retrieved from the Internet: <URL: http://letstalkpayments.com/banks-that-have-implemented-social-media-payments-through-facebook-and-twitter-2/, (Apr. 25, 2015), 3 pgs.

Vitak, Jessica, et al., "The Future of Networked Privacy: Challenges and Opportunities", CSCW'15 Companion, (Mar. 2015), 6 pgs.

Wang, Yang, et al., "I regretted the minute I pressed share : A Qualitative Study of Regrets on Facebook", Symposium on Usable Privacy and Security, (Jul. 2011), 16 pgs.

* cited by examiner

ELECTRONIC ALERTS FOR CONFIDENTIAL CONTENT DISCLOSURES

TECHNICAL FIELD

Embodiments described herein generally relate to content analysis and in particular, but without limitation, to electronic alerts for confidential content disclosures.

BACKGROUND

Users maintain a variety of online accounts. These accounts may be protected in a number of ways including passwords, biometric identifiers, account identifiers, or combinations thereof. The users may also be part of one or more social networks. The users may post content to the social networks to share privately with one or more defined connections, or publically.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The proliferation of social networks (and websites in general) has increased the amount of data available to misappropriate by unauthorized users. These users may attempt to steal the identity of a user, commit credit card fraud, or other potentially damaging activities. Even though, the data needed to access an account (e.g., a bank or credit card account) may not exist in a single place, the unauthorized users may gather it from multiple sources. Thus, although an authorized user may believe he or she is keeping data private, the authorized user may still be at risk based on content he or she posts online.

In various examples described herein, an online content analysis system monitors content and privacy settings associated with online accounts of a user. The system may prevent the user from inadvertently disclosing information that may be used to compromise either the online account or another account of the user.

Figure 1:
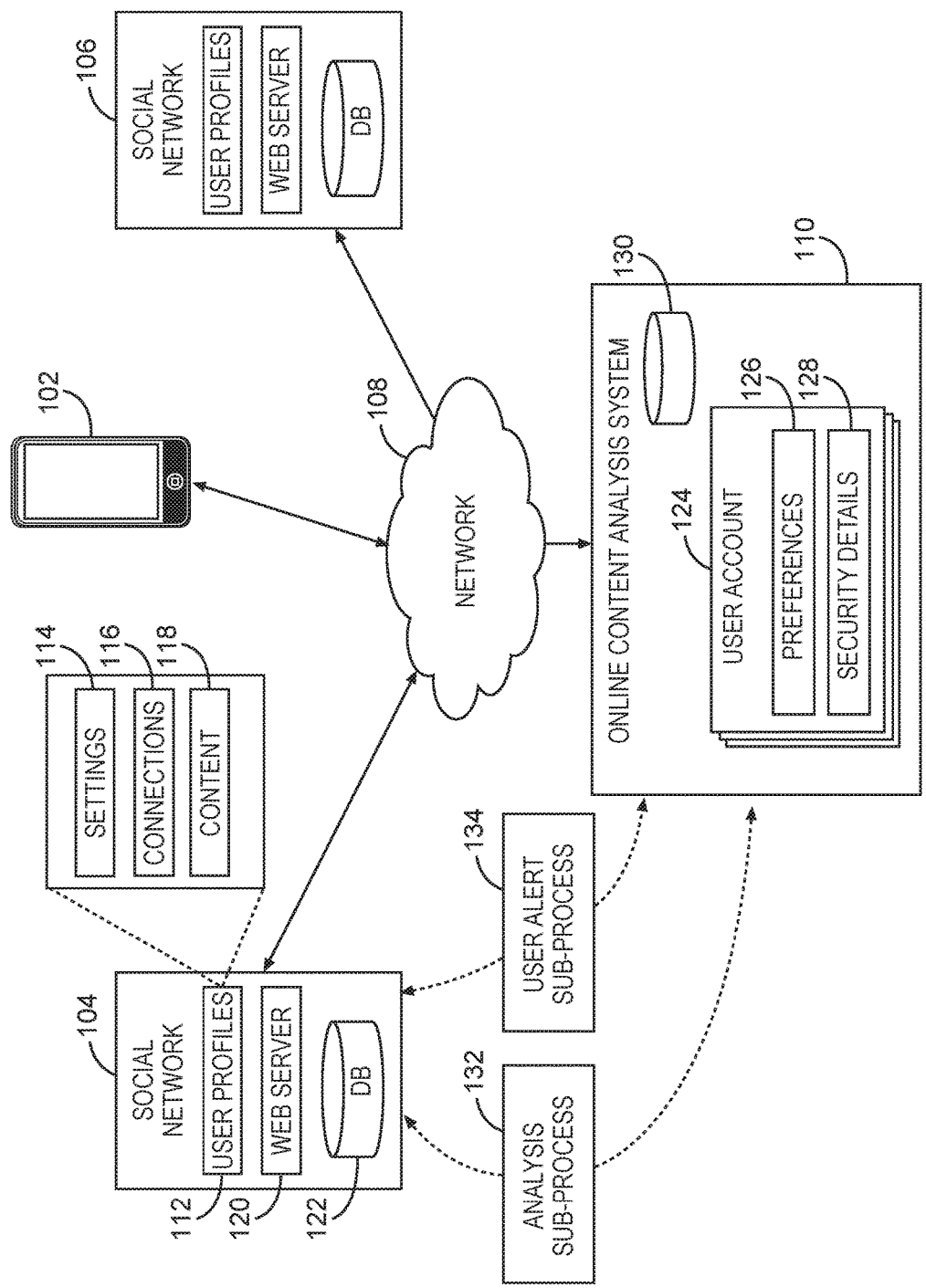
FIG. 1 is a schematic diagram of components interacting with an online content analysis system, according to various examples.

FIG. 1 illustrates a schematic diagram of components interacting with an online content analysis system 110. FIG. 1 includes computing device 102, social network 104, social network 106, network 108, and online content analysis system 110. Social network 104 is illustrated as including user profile 112 that in turn includes privacy settings 114, user connections 116, and content 118. Social network 104 further includes web server 120 and database 122. Online content analysis system 110 is illustrated as including user account 124, preferences 126, security information 128, and database 130. FIG. 1 further illustrates analysis subprocess 132 and user alert subprocess 134. Both analysis subprocess 132 and user alert subprocess 134 are illustrated as existing outside of social network 104 or online content analysis system 110 but may be present in either location (or both).

In various examples, the servers and components in FIG. 1 may communicate via one or more networks such as the network 108. The network 108 may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 108 may include a single local area network (LAN) or wide-area network (WAN), or combinations of LAN's or WAN's, such as the Internet.

Data used in the various components may be organized and stored in a variety of manners. For convenience, the organized collection of data is illustrated as a series of databases—database 122, database 130, and the database in social network 106. The specific storage layout and model used in these databases may take a number of forms—indeed, each database may utilize multiple models. The databases may be, but are not limited to, a relational database (e.g., SQL), non-relational database (NoSQL) a flat file database, object model, document details model, or a file system hierarchy. The databases may store data on one or more storage devices (e.g., a hard disk, random access memory (RAM), etc). The storage devices may be in stand-alone arrays, part of one or more servers, and may be located in one or more geographic areas.

In an example, a social network (such as social network 104) represents an online service to which a user may post content via web server 120 using computing device 102 (mobile phone, tablet, laptop, desktop pc, etc.). Content may be image data (e.g., photographs or video), textual data (e.g., a status update), location data (e.g., past, present, or fixture), or combinations thereof. The user may have connections with one or more other users on the social network 104. A connection may enable easy sharing of content to the connections. In some examples, unless a first user has a connection with a second user, the first user cannot see content of the second user. The first user may establish a connection with the second user by sending a request via the social network 104 to the second user.

The social network 104 may maintain a user profile for each user that posts content to the social network 104. An individual profile may include privacy settings 114, user connections 116, and content 118. The privacy settings 114 may identify people or entities that are authorized to access information associated with the user. The information may include current and past biographical data (e.g., age, name, home address), occupation data, relationships (e.g., spouse, father, mother; siblings, etc.), and content 118. The privacy settings 114 may be set according to the type of information and connections. For example, the user may allow one connection to see all content while only allowing some content to be seen by another connection—similar privacy data differentiations may also be made for the biographical data, etc.

In various examples, a user wants to protect information that may comprise one or more other online accounts or credit of the user. The online content analysis system 110 may provide a service to monitor—in real-time or past—content posted by the user and provide warnings when potentially comprising information is being or has posted. Online content analysis system 110 may access content of the user in a range of ways.

One way is to establish a connection between the user and the online content analysis system 110 via the social network 104. The connection may be of the same type that the user has with other users in social network 104. In other words, the user may become "friends" with the online content analysis system 110. To accomplish the connection, an account may be created by online content analysis system 110 on social network 104. For discussion purposes, the account may be referred to as a monitoring account; however, to the users of social network 104, the monitoring account may look the same as if it was being run by a person, as opposed to online content analysis system 110. Either the user can send a connection request to the monitoring account or vice versa. In either instance, the user may grant the monitoring account the highest level of access to content posted by the user and information contained in the user's profile on social network 104. If the user has accounts on more than one social network (e.g., social network 106), online content analysis system 110 may create accounts on the other social networks and connect with the user.

The social network 104 may allow additional functionality (e.g., games, quizzes, photo tools) to be used by users on social network 104 via application. Thus, the user may connect with online content analysis system 110 via such an application. As with the monitoring account, the user may authorize access to content and profile information of the user.

Yet another way online content analysis system 110 may monitor profile and content posted by the user may be direct access granted by social network 104. Thus, online content analysis system 110 may forward or pass-through content being posted by the user to social network 104. The user may grant authorization to social network 104 through a separate request presented (e.g., e-mailed, displayed on a mobile application, push notification, displayed on a webpage) by the social network 104 to the user. Other authorization mechanisms may also be used without departing from the scope of this disclosure.

Social network 104 may provide an Application Programming Interface (API) for use by online content analysis system 110. The API may respond to requests for content of a user that has granted authorization to online content analysis system 110. The API may provide a series of data fields that include the content as well as contextual information about the content. This information may include the time of the post, the audience (e.g., public, private, group) of the content, and the location of the computing device when the content was posted.

In addition to having accounts at a variety of social networks, the user may also maintain a user account such as user account 124 presented in FIG. 1. The user account 124 may store content analysis preferences 126 set by the user. The content analysis preferences 126 may determine what content type is monitored, how it is monitored, and alert preferences if the analysis determines a potential security leak (e.g., posting of security information, discussed in more detail below). The user may change these preferences using interfaces (e.g., web, app, etc.) provided by the online content analysis system 110 and displayed on computing device 102. The precise user interface elements (e.g., drop-down menus, forms, etc.) is beyond the scope of this disclosure and a variety of elements may be used without departing from the scope of this disclosure.

With respect to the type of content, a user may limit the type of information to monitor for potential risks. For example, the user may have the online content analysis system 110 only look at information posted in their profile. Similarly, the user may limit the online content analysis system 110 to only examine content posted publicly (as opposed to content shared directly with another user). Accordingly, a non-exhaustive list of types of content to monitor may include profile information, images posted, status updates, public/private or other subsets of users, and combinations thereof.

The user may also set preferences of how content is monitored. These preferences may include the way the online content analysis system 110 connects with the user as discussed above. The "how" preferences—as well as the other preferences—may be set per social account. If a user has indicated that a social network is to connect as another user of a social network, the user may customize the monitoring account. For example, the user may change the name and profile picture of the monitoring account. Thus, if a friend of the user sees the monitoring account, the friend will not know be able to tell the monitoring account is actually a service that is monitoring content.

Furthermore, the "how" preference may trigger the transmission of the authorization for access to content of the user. For example, the customized monitoring account may transmit an authorization request via social network 104 to begin monitoring content of user. In addition to setting preferences, the user interface provided by the online content analysis system 110 may indicate the status of authorization with respect to a social network. Thus, the user interface may indicate that a connection request has been transmitted and accepted by the user, or that the user has not yet responded to an authorization request by a social network to forward content to online content analysis system 110.

The "how" preferences may also indicate the level of sensitivity used for monitoring. A user may indicate that he/she does not want to be alerted based on simple keyword matching, but would prefer online content analysis system 110 alert when there is a certain level of confidence security information is being posted; this is discussed in more detail below in FIG. 2.

The alerts preferences identify how online content analysis system 110 should react if the content is determined to be a potential security risk. Options may include, but are not limited to, analyzing content before posting and alerting pre-post, and analyzing content after posting and alerting post-post. The alert preferences may also include which device(s) to alert and where the alert should appear. These preferences may be set to allow a push notification to appear on computing device 102, a notification to appear within social network 104, etc.

Turning back to FIG. 1, user account 124 includes user security information 128. Online content analysis system 110 may use the information identified by user security information 128 to determine if a user has posted/or is attempting to post information that may compromise an account of the user. In order to facilitate this analysis, the user may provide online content analysis system 110 with information on what types of security questions they have used on various accounts (social or otherwise) and the answers to those questions. In some examples, the user provides online content analysis system 110 with account names and passwords/tokens to directly access the accounts to retrieve the security questions and answers (e.g., using screen scraping); however, some users may not be comfortable with that level of access.

The user security information 128 may map the security questions to the accounts based on user input. The mappings may be used to better tailor mitigation options to the user. For example, if a specific security question has been comprised, the online content analysis system 110 may alert the user with a list of all accounts using the security question.

The user may also provide a keyword list that identifies the answers of the questions without identifying the questions. User security information 128 may also include a list of account numbers, credit numbers, etc., of the user. Each user may decide to input more or less information of the above depending on the user's comfort level. Thus, after entering in user security information 128, online content analysis system 110 may have a corpus of information that may be checked when a user posts content on a social network.

Figure 2:
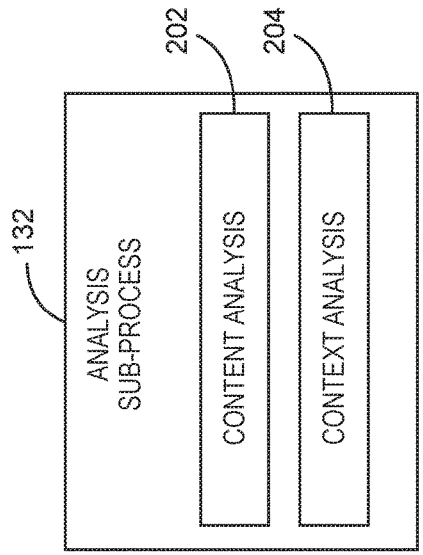
FIG. 2 illustrates components of an analysis subprocess, according to various examples.

FIG. 2 illustrates components of analysis subprocess 132, according to various examples. The analysis subprocess 132 may include content analysis 202 and context analysis 204. The analysis subprocess 132 may be executed on one or more computing devices using one or more processors. Non-transitory computer-readable mediums may include instructions for performing analysis subprocess 132. FIG. 1 indicates that execution of analysis subprocess 132 may take place at social network 104 or online content analysis system 110, but the execution is not limited to these locations. Both analysis subprocess 132 and user alert subprocess 134 are discussed in further detail after the following overview of FIG. 3.

Figure 3:
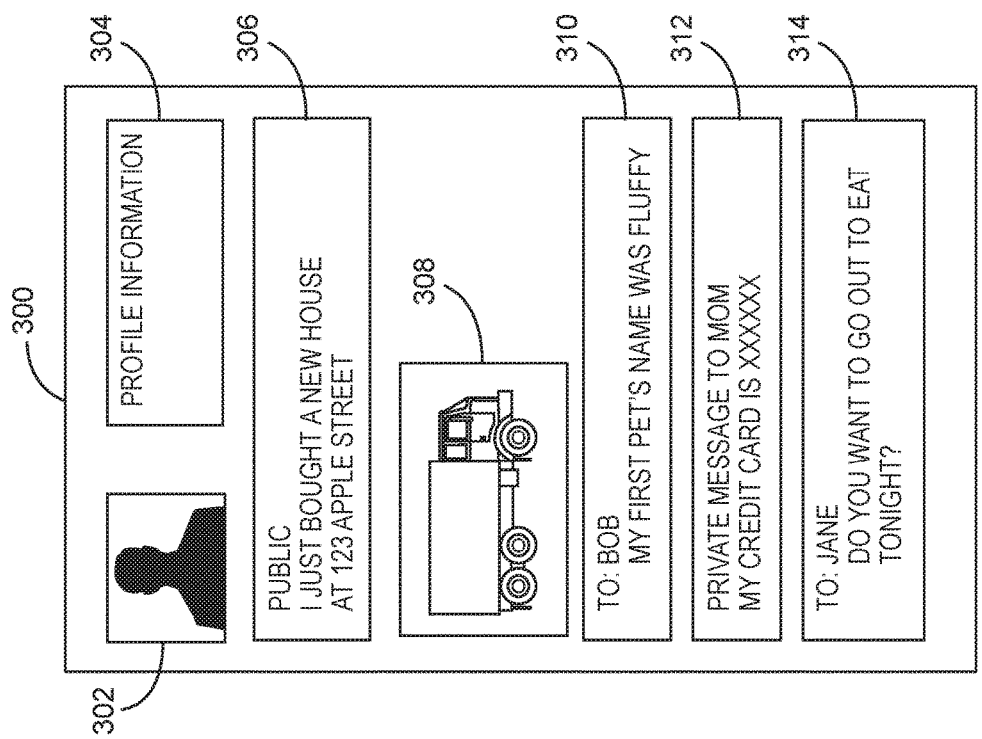
FIG. 3 illustrates an example interface of a social network, according to various examples.

FIG. 3 illustrates an example interface 300 of a social network. The user interface 300 may be an interface that is presented to a user after logging into social network 104 or social network 106. The user interface 300 includes profile picture 302, profile information 304, public content 306, image content 308, user-to-user content 310, private content 312, and user-to-user content 314.

With reference back to FIG. 2, content analysis 202 may analyze content posted by the user, such as that in user interface 300, for information identified in user security information 128. The analysis may be textual or image analysis that look for literal keyword/phrase matching and/or calculating a likelihood/confidence of a match. Keyword/phrase matching may include taking the corpus of information in user security information 128 and comparing it to content posted by the user.

For illustration purposes, assume that profile information 304 includes the phrase "high school" and that security information 128 indicates that one of the security questions used by the user is the "high school" of the user. Based on this information, regardless of what the high school is, or what the account the security question was for, the result of the content analysis 202 may indicate the user has posted information that puts the user at risk.

In another illustration, consider that the user indicates the answer to one of the questions was "Matt" in response to "What was the name of your childhood friend?" If the online content analysis system 110 alerts the user every time "Matt" is posted, the user may end up ignoring the alerts as superfluous or turn off alerts all together. Thus, content analysis 202 may not only use the answer to a security question but the question in determining the likelihood the information may be used by a potential attacker. One technique may be to calculate a similarity score between the words in a content post and the security question and answer in user security information 128. If the user posts content in response to a question, the question may also be included in the similarity score. Consequently, online content analysis system 110 may only alert the user if the score is above a certain threshold.

For example, consider that the security question has a length of seven words and the answer has a length of two words. A relatively straightforward technique may be to count how many of the seven words are present in a content posting that also includes the two words of the answer. More complex techniques may take into consideration the order of the words in the content in comparison to the text of the security questions. Consequently, content with five of the seven words in the order they are in the security is given a higher likelihood of a match (e.g., the content is posting security information) compared to content with the same five words, but in a different order. Other techniques for calculating similarity may be used without departing from the scope of this disclosure.

Beyond the words in the content themselves, analysis subprocess 132, via context analysis 204, may look at the context of how the content is posted to adjust the likelihood that the content presents a security risk. In other instances, context is determined prior to analyzing the content. Thus, a determination may be mad that there is no security risk regardless of whether or not the content is sensitive.

With reference back to FIG. 3, consider public content 306 that identifies the current address of the user. Because the information is public, anyone could use this information if it was important to obtaining access to one of the user's accounts. Accordingly, online content analysis system 110 may flag the content and alert the user.

In contrast, private content 312 includes credit card information a user would normally want to remain out of the hands of the public. Thus, even though content analysis 202 would likely indicate a match, context analysis 204 may decide an alert should not be sent because the content was transmitted privately. The decision may be based in part on the settings in content analysis preferences 126 (with reference back to FIG. 1).

Context analysis 204 may also take into consideration the length of time a friend of the user has been connected with the user in making an alert determination. Thus, if user-to-user content 310 is posted to a friend that has been connected with the user for than a certain threshold of time (e.g., one year), no alert may be set (assuming a match has been made). However, if the friend is new (e.g., less than one year), an alert may be presented to the user.

Context analysis 204 may also examine the content that has been posted in aggregation with other content on the same social network or other networks. Thus, if a security answer has more than one word, the context analysis may take into consideration recently posted content to determine if there has been a potential security risk. For instance, the answer to "What is your favorite fruit" might be "Granny Smith Apples." If user posts "apples," content analysis 202 may not flag the content, but if "Granny Smith" is posted in the next piece of content, an alert may be transmitted to the user. The sensitivity of how fax back in time (e.g., one minute, five posts, etc.) context analysis 204 may look may be set by the user or an admin of online content analysis system 110.

Figure 4:
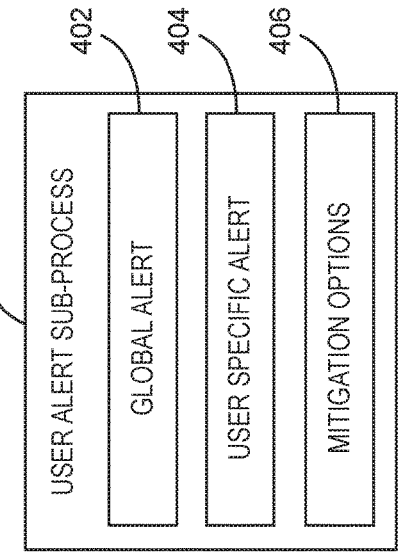
FIG. 4 illustrates components of a user alert subprocess, according to various examples.

FIG. 4 illustrates components of a user alert sub-process 134 according to various examples. The user alert sub-process 134 includes global alerts 402, user-specific alerts 404, and mitigation option 406. A global alert is an alert that may affect more than one user based on events external to the user (but still potentially related to the user). A user-specific alert is targeted to the user based on analysis sub-process 132 and may be transmitted in accordance with the preferences of the user in user account 124. In either case, one or more mitigation options may be presented to user(s) that receives the alert.

In addition to monitoring for direct security risks—such as posting information included in a security question—online content analysis system 110 may monitor for indirect security risks. An indirect risk may be related to security breaches at companies/locations related to activities of a user. For example, consider that a security breach is publicized about company A. Online content analysis system 110 may query database 130 to determine all user accounts that list company A (e.g., in security information 128). Then, alerts (e.g., push notifications) may be transmitted to the user based on their alert preferences in their respective user accounts at online content analysis system 110. To obtain the list of companies that have had security breaches, online content analysis system 110 may connect with a third-party service (not shown) though an Application Programming Interface (API) that provides a data stream of recent security breaches.

The third-party service may also provide a list of locations with a high incidence of credit-card fraud, which may indicate a card skimmer or other problem is present at the location. Online content analysis system 110 may analyze content using analysis sub-process 132 to determine users that have recently been to, or are planning on going to, one of these locations. For example, social network 104 may provide event content in which a user may indicate he/she is going to attend. Online content analysis system 110 may have authorization to this data based on the initial authorization of the user. If a location match is found, user alert sub-process 134, via global alerts 402, may transmit a notification to the user(s). Location determinations may also be made by requesting location information of a user's device or via the API as discussed above. Obtaining location information may also be accomplished by having the user download an application on to the user's device and granting location permissions to the application.

Depending on the why an alert was sent, and the preferences of the user, different mitigation option 406 may be presented with the alert. Mitigation options may include preventing the content from being posted to an account, presenting a link to change your security question, presenting a link to cancel an account, among others. As an illustration, a message to change a security question at Bank A may be presented when analysis sub-process 132 determines that a user has posted the answer to the security question.

Figure 5:
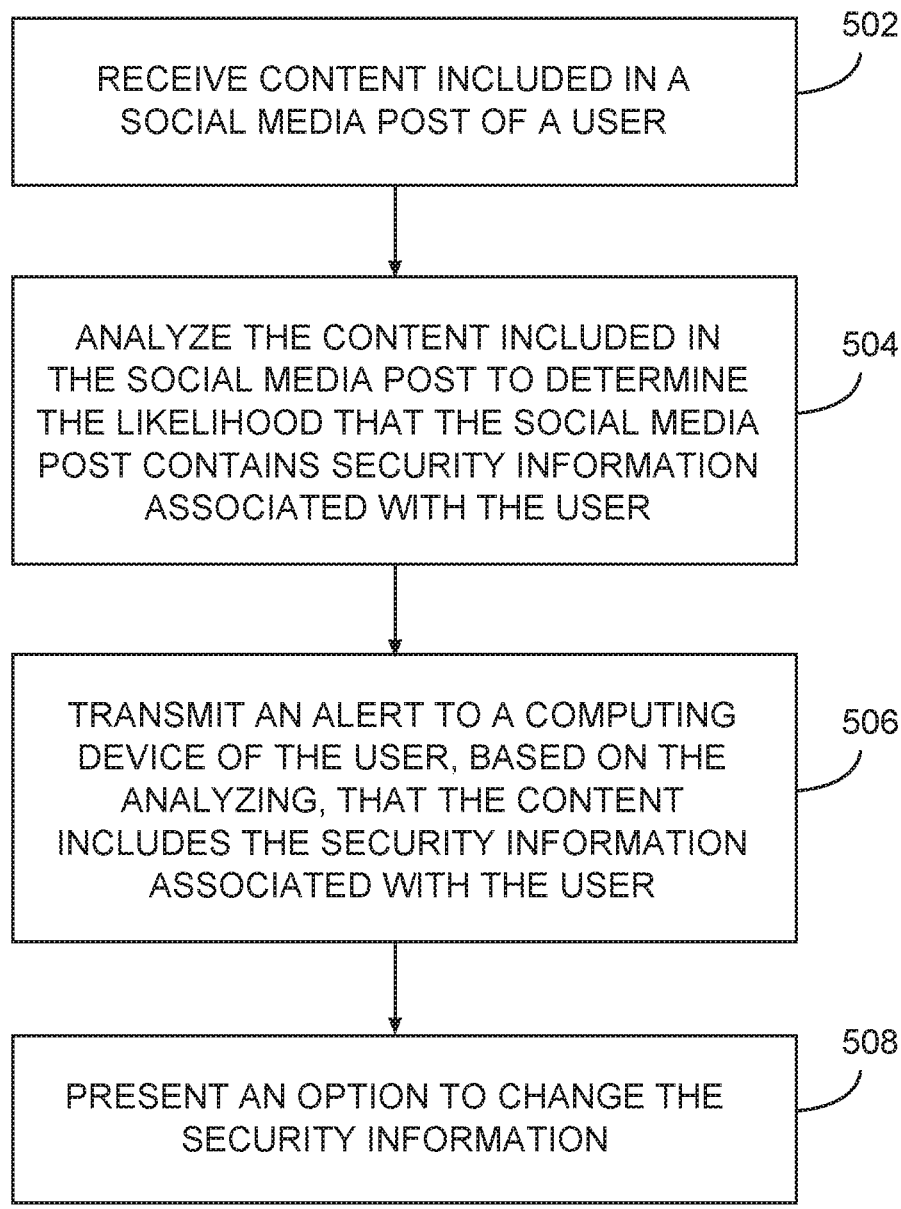
FIG. 5 illustrates a flowchart of a method for alerting a user of a potential security risk, according to various examples.

FIG. 5 illustrates a flowchart of a method for alerting a user of a potential security risk, according to various examples. The method 500 may be performed by any of the modules, layers, logic, or components described herein. In block 502, content included in a social media post is received. The content may be received an online content analysis system based on authorization previously given by the user. The authorization may be in response to a permission request transmitted to the user for accessing social media posts of the user.

At block 504, the content included in the social media post is analyzed to determine a likelihood that the social media post contains security information associated with the user. Analyzing may include retrieving an answer to a security question associated with authentication information of the user. The retrieving may include querying a database using an identifier of the user (e.g., user name, account name, etc.). The authentication information may be information given to an online content analysis system. The authentication information may include a list of security questions and answers to those security questions.

In an example, the social media post includes image content. Optical character recognition may be performed on the image content to determine if it includes authentication information of the user (e.g., the user may post a picture of a street address).

At block 506, an alert is transmitted to a computing device of the user, based on the analyzing, that the content includes the security information associated with the user. The alert may be transmitting before the content is posted to a social media site thereby intercepting it. If the post has been intercepted, an option to change the social media post before posting to the online network may be presented.

In an example, the intended recipient of the social media post is determined. Alerting the user may be based on the length of time the user and intended recipient have been connected on the social network. Thus, if the analysis indicates a high likelihood of security information being posted, an alert may be withheld if the length of time is greater than a year. Alerting may also be based on the publicness of the social media post. Thus, if the post is a private message between two users, an alert may not be presented.

At block 508, an option to change the security information is presented. The option may be a link to a website of an account of the user for which the security information is associated.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
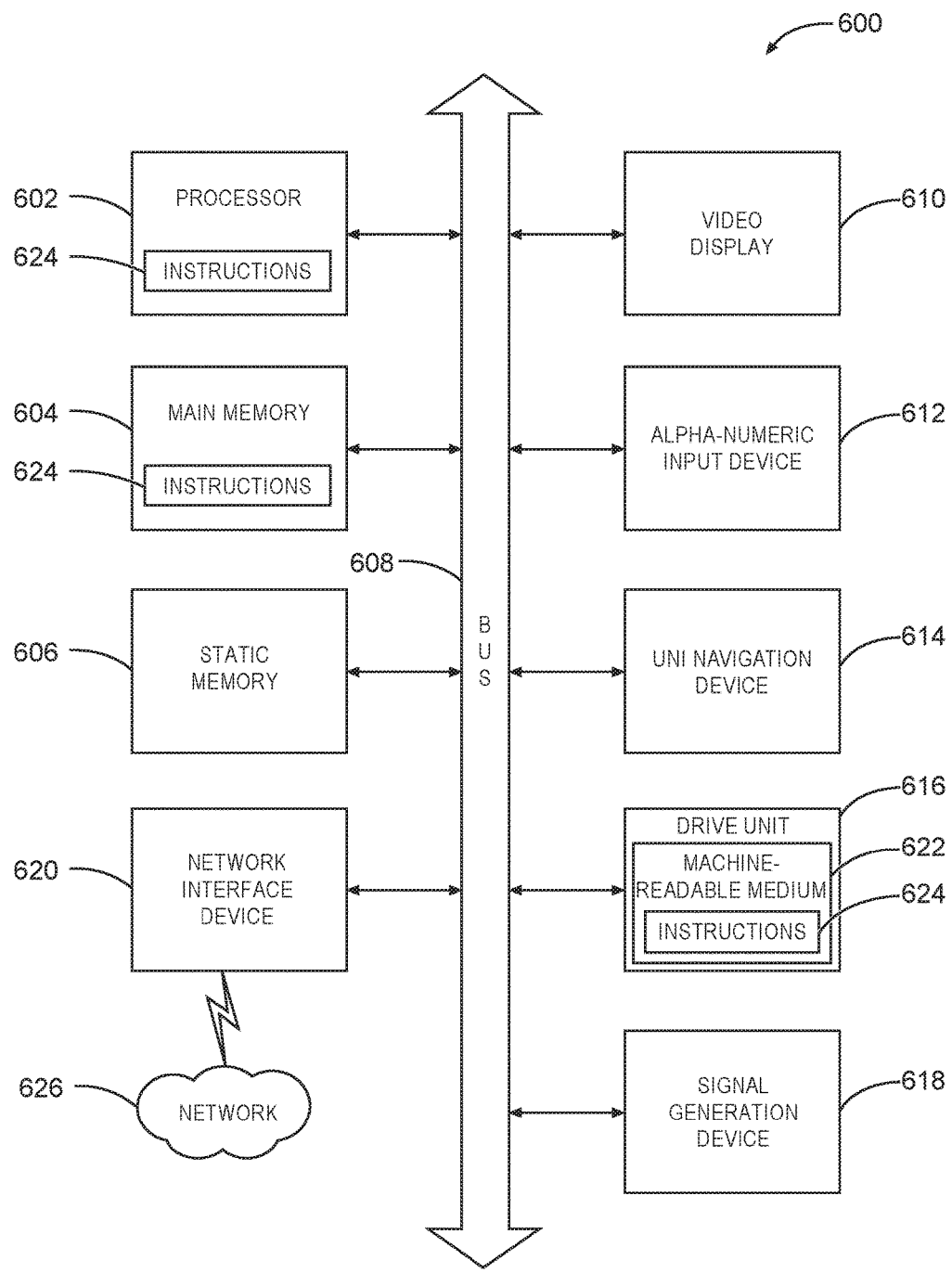
FIG. 6 is a block diagram illustrating an example machine upon which any one or more of the techniques (e.g., methodologies) discussed herein may be performed, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse) In one embodiment, the video display unit 610, input device 612 and III navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:
1. A method comprising:
receiving content included in a social media post or a user;

analyzing the received content included in the social media post to determine a likelihood that the social media post contains security information associated with the user;

determining an intended recipient of the social media post on a social network and a length of time the user and intended recipient have been connected on the social network;

transmitting an alert to a computing device of the user, based on the analyzing and the determined length of time, wherein the alert is withheld when the determined length of time is greater than a threshold amount of time and determining that the length of time is less than the threshold amount of time, that the content includes the security information associated with the user; and subsequently presenting an option to change the security information.

2. The method of claim 1, wherein analyzing the content included in the social media post includes:

retrieving an answer to a security question associated with authentication information of the user; and comparing the content of the social media post to the answer.

3. The method of claim 1, further comprising:

transmitting a permission request to the user to access social media posts of the user.

4. The method of claim 1, wherein the social media post includes image content and where analyzing the content included in the social media post includes performing optical character recognition on the image content.

5. The method of claim 1, further comprising:

intercepting the social media post before it is posted to an online network; and presenting an option to change the social media post before posting to the online network based on the analyzing.

6. The method of claim 1, wherein transmitting the alert to the computing device of the user is based on the publicness of the social media post.

7. A system comprising:

at least one hardware processor;

a storage device comprising instructions, which when executed by the at least one hardware processor, configure the at least one hardware processor to perform operations comprising:

receiving content included in a social media post or a user;

analyzing the received content included in the social media post to determine a likelihood that the social media post contains security information associated with the user;

determining an intended recipient of the social media post on a social network and a length of time the user and intended recipient have been connected on the social network, transmitting an alert to a computing device of the user, based on the analyzing and the determined length of time, wherein the alert is withheld when the determined length of time is greater than a threshold amount of time and determining that the length of time is less than the threshold amount of time, that the content includes the security information associated with the user; and subsequently presenting an option to change the security information.

8. The system of claim 7, wherein analyzing the content included in the social media post includes:

retrieving an answer to a security question associated with authentication information of the user; and comparing the content of the social media post to the answer.

9. The system of claim 7, wherein the operations further comprise:

transmitting a permission request to the user to access social media posts of the user.

10. The system of claim 7, wherein the social media post includes image content and where analyzing the content included in the social media post includes performing optical character recognition on the image content.

11. The system of claim 7, wherein the operations further comprise:

intercepting the social media post before it is posted to an online network; and presenting an option to change the social media post before posting to the online network based on the analyzing.

12. The system of claim 7, wherein transmitting the alert to the computing device of the user is based on the publicness of the social media post.

13. A non-transitory computer-readable medium comprising instructions, which when executed by at least one hardware are processor, configure the at least one hardware processor to perform operations comprising:

receiving content included in a social media post of a user;

analyzing the received content included in the social media post to determine a likelihood that the social media post contains security information associated with the user;

determining an intended recipient of the social media post on a social network and a length of time the user and intended recipient have been connected on the social network;

transmitting an alert to a computing device of the user, based on the analyzing and the determined length of time, wherein the alert is withheld when the determined length of time is greater than a threshold amount of time and determining that the length of time is less than the threshold amount of time, that the content includes the security information associated with the user; and subsequently presenting an option to change the security information.

14. The computer-readable medium of claim 13, wherein analyzing the content included in the social media post includes:

retrieving an answer to a security question associated with authentication information of the user; and comparing the content of the social media post to the answer.

15. The computer-readable medium of claim 13, the operations further comprising:

transmitting a permission request to the user to access social media posts of the user.

16. The computer-readable medium of claim 13, wherein the social media post includes image content and where analyzing the content included in the social media post includes performing optical character recognition on the image content.

17. The computer-readable medium of claim 13, the operations further comprising:

intercepting the social media post before it is posted to an online network; and presenting an option to change the social media post before posting to the online network based on the analyzing.

* * * * *

UNITED STATES PATENT AND TRADEMARK OFFICE
CERTIFICATE OF CORRECTION

PATENT NO. : 9,940,482 B1
APPLICATION NO. : 14/985755
DATED : April 10, 2018
INVENTOR(S) : Nichols et al.

Page 1 of 1

It is certified that error appears in the above-identified patent and that said Letters Patent is hereby corrected as shown below:

In the Claims

In Column 10, Line 67, in Claim 1, delete "or" and insert --of-- therefor

In Column 11, Line 13, in Claim 1, after "time", insert --;--

In Column 11, Line 47, in Claim 7, delete "or" and insert --of-- therefor

In Column 11, Line 60, in Claim 7, after "time", insert --;--

In Column 12, Line 26, in Claim 13, after "hardware", delete "are"

In Column 12, Line 42, in Claim 13, after "time", insert --;--

Signed and Sealed this
Twenty-eighth Day of May, 2019

Andrei Iancu
*Director of the United States Patent and Trademark Office*